US009304209B2

(12) United States Patent
Hoang et al.

(10) Patent No.: US 9,304,209 B2
(45) Date of Patent: Apr. 5, 2016

(54) CROSS-CORRELATION MITIGATION ALGORITHMS FOR GNSS SYSTEMS USING COMMON OVERLAY CODES

(71) Applicant: QUALCOMM Incorporated, San Diego, CA (US)

(72) Inventors: Duong Anh Hoang, San Diego, CA (US); Emilija Milorad Simic, San Diego, CA (US); Timothy Paul Pals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 13/801,631

(22) Filed: Mar. 13, 2013

(65) Prior Publication Data

US 2014/0266874 A1     Sep. 18, 2014

(51) Int. Cl.
*G01S 19/42*     (2010.01)
*G01S 19/21*     (2010.01)
*G01S 19/30*     (2010.01)

(52) U.S. Cl.
CPC ............ *G01S 19/42* (2013.01); *G01S 19/21* (2013.01); *G01S 19/30* (2013.01)

(58) Field of Classification Search
CPC .......... G01S 19/09; G01S 19/38; G01S 19/42
USPC .............. 342/357.21, 357.25, 357.4, 357.43; 701/468, 469
See application file for complete search history.

(56) References Cited

U.S. PATENT DOCUMENTS

| 6,236,354 | B1 | 5/2001 | Krasner |
| 7,750,843 | B2 | 7/2010 | Ray et al. |
| 7,994,981 | B1 | 8/2011 | Farrokhi et al. |
| 8,059,700 | B2 | 11/2011 | Lopez-Risueno et al. |
| 2011/0068973 | A1 | 3/2011 | Humphreys et al. |
| 2011/0103432 | A1 | 5/2011 | Tangudu et al. |

OTHER PUBLICATIONS

International Search Report and Written Opinion—PCT/US2014/025239—ISA/EPO—Sep. 4, 2014.
Spilker, J.J., et al., "Proposed New L5 Civil GPS Cods", Navigation, Institute of Navigation, vol. 48, No. 3,Dec. 1, 2001, pp. 135-143.
Stansell, T. et al., "GPS L1C: Enhanced Performance, Receiver Design Suggestions, and Key Contributions", GNSS 2010—Proceedings of the 23$^{rd}$ International Technical meeting of the Satellite Division of the Institute of Navigation (ION GNSS 2010), Sep. 24, 2010, pp. 2860-2873.

*Primary Examiner* — Dao Phan
(74) *Attorney, Agent, or Firm* — Kilpatrick Townsend Stockton LLP (57) ABSTRACT

Methods and systems for evaluating Global Navigation Satellite System (GNSS) signals are provided. Each of a first GNSS signal received by a GNSS receiver and a second GNSS signal received by the GNSS receiver is accessed. The second GNSS signal can have temporal fluctuations weaker than temporal fluctuations in the first GNSS signal. A delay between a sequence in the first GNSS signal and a corresponding sequence signal in the second GNSS signal is estimated and compared to a threshold. Upon determining that the delay exceeds the threshold, a location is estimated using both the first GNSS signal and the second GNSS signal.

21 Claims, 8 Drawing Sheets

CROSS-CORRELATION MITIGATION ALGORITHMS FOR GNSS SYSTEMS USING COMMON OVERLAY CODES

BACKGROUND

In Global Navigation Satellite Systems (GNSSs), satellite vehicles (SVs) transmit signals that are received by receivers. For each SV, both the SV and the receivers generate a same pseudo-random noise (PRN) code. The code generated for each SV is different, but they are not orthogonal to each other. Upon detecting a signal, a receiver can cross-correlate the signal with each of a set of PRN codes. Based on the results of cross-correlations, the receiver can estimate which SV transmitted the signal and a time that it took the signal to propagate from the SV to the receiver. The receiver can then use a set of these estimations, each being associated with a different signal and SV, to estimate a distance separating the receiver from each SV in the set. Based on these differences and on known locations the SVs, the receiver can estimate its location.

In many GNSSs, all SVs share the same frequency band. Depending on propagation conditions, power of the SVs at the receiver can vary greatly. In attempt to detect a signal possibly from a weak SV, the receiver may mistakenly identify leakage of the signal from a strong SV as being from a different SV. This can result in a false "detection" of a signal from the second SV, which can impair the accuracy of the position estimation.

Various "mask" techniques can be used to reduce the false detections. In these instances, it is estimated that a weak signal is attributable to cross-correlations between a strong signal and the PRN code at issue (due to the non-orthogonal nature of the signals) if one or more conditions are met. However, if the conditions are too stringent, then these techniques preclude utilization of informative signals in estimating the receiver's location. This can thereby increase the location-estimation time and/or decrease the location-estimation accuracy.

These consequences can be even further pronounced in GNSSs in which a signal is modulated not only by a PRN code but also by an overlay code. The overlay code can result in instances in which a strong SV signal could produce sizable cross-correlation values with a various PRN codes over a broad frequency domain. Thus, to avoid false SV detections, mask techniques can extend the conditions under which a SV signal is to be attributable to a strong-SV signal. This amplifies the time and accuracy impairments on location-estimation efforts.

SUMMARY

Techniques are provided to improve detection of signals from weak satellite vehicles (SVs), especially in the context of Global Navigation Satellite Systems (GNSSs) utilizing overlay codes. A detected weak signal can first be tentatively associated with a weak-SV pseudo-random noise (PRN) code and tentatively associated with a strong signal. These associations are ultimately exclusive. The detected signal is modified to remove a fixed overlay code or an overlay code associated with the weak-SV PRN code. A cross-correlation between the detected weak signal and repeated strings (e.g., such that the repeated strings total 20 ms or longer) of the PRN code is performed. The cross-correlogram is then analyzed to detect characteristics indicative of alignment or misalignment between bits in the two signals.

For example, for each signal, a temporally varying overlay-code contribution can be identified. A combined overlay-code contribution can be defined such that the combined contribution is constant in time when the overlay-code contributions are identical to each other. The combined contribution can be transformed. If a peak in the transform is not near zero Hertz, it can be inferred that the bits in the two overlay-code contributions are not aligned. As another example, the overlay-code contributions can be cross-correlated. If a peak in the correlogram is not near t=0, it can be inferred that the bits in the two overlay-code contributions are not aligned.

If it is determined (e.g., or inferred) that the bits are not aligned, it can be further inferred that the weak and strong signals originated from different SVs (rather than the weak signal being a byproduct of the strong signal). Thus, both signals can be used to estimate a location of the receiver.

In some embodiments, a method for evaluating GNSS signals is provided. Each of a first GNSS signal received by a GNSS receiver and a second GNSS signal received by the GNSS receiver is accessed. The second GNSS signal can have temporal fluctuations weaker than temporal fluctuations in the first GNSS signal. A delay between a sequence in the first GNSS signal and a corresponding sequence signal in the second GNSS signal is estimated and compared to a threshold. Upon determining that the delay exceeds the threshold, a location is estimated using both the first GNSS signal and the second GNSS signal.

In some embodiments, a system for evaluating GNSS signals is provided. The system can include a GNSS receiver configured to receive a first GNSS signal and to receive a second GNSS signal. The second GNSS signal can have temporal fluctuations weaker than temporal fluctuations in the first GNSS signal. The system can also include a code-contribution analyzer configured to estimate a delay between a sequence in the first GNSS signal and a corresponding sequence signal in the second GNSS signal and to compare the delay to a threshold. The system can further include a location estimator configured to, upon a determination from the code-contribution analyzer that the delay exceeds the threshold, estimate a location using both the first GNSS signal and the second GNSS signal.

In some embodiments, a system for evaluating GNSS signals is provided. The system can include means for receiving a first GNSS signal and for receiving a second GNSS signal. The second GNSS signal can have temporal fluctuations weaker than temporal fluctuations in the first GNSS signal. The system can also include means for estimating a delay between a sequence in the first GNSS signal and a corresponding sequence signal in the second GNSS signal and means for comparing the delay to a threshold. The system can further include means for estimating, upon determining that the delay exceeds the threshold, the location using both the first GNSS signal and the second GNSS signal.

In some embodiments, a computer-readable storage medium is provided which containing program instructions, that, when executed by a processor, cause the processor to execute a method. The method can include accessing a first GNSS signal received by a GNSS receiver and accessing a second GNSS signal received by the GNSS receiver. The second GNSS signal can have temporal fluctuations weaker than temporal fluctuations in the first GNSS signal. The method can also include estimating a delay between a sequence in the first GNSS signal and a corresponding sequence signal in the second GNSS signal and comparing the delay to a threshold. The method can further include, upon determining that the delay exceeds the threshold, estimating a location using both the first GNSS signal and the second GNSS signal.

DETAILED DESCRIPTION

Figure 1:
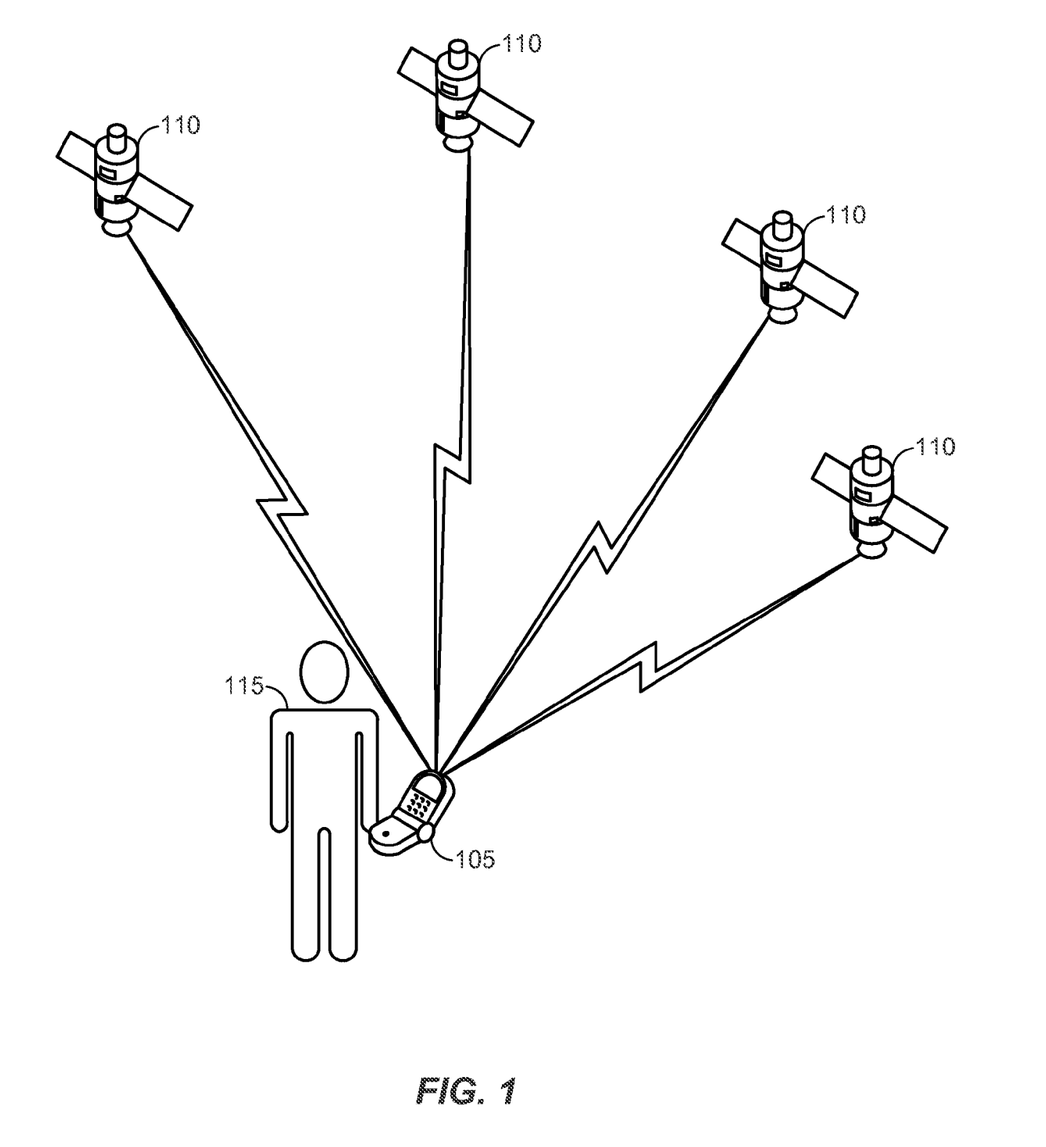
FIG. 1 illustrates an instance in which a receiver can receive signals from with a set of satellite vehicles (SVs) in order to estimate its location.

In some embodiments, disclosed systems, devices and methods improve the ability to detect signals of weak power from satellite vehicles (SVs). FIG. 1 illustrates an instance in which a receiver (e.g., a receiver in mobile device 105) can receive signals from with a set of SVs 110 in order to estimate its location. Mobile device 105 can include any device that a user 115 is likely to carry on his person and that can communicate with SVs 110 as described herein. Mobile device 105 can include, e.g., a phone, a smartphone, an electronic device, or a laptop. In some instances, a non-mobile device and/or vehicle accessory can be used in place of mobile device 105.

SVs 110 can be parts of one or more Global Navigation Satellite Systems (GNSSs), such as the Beidou system, the Global Positioning System (GPS), or Galileio E1. Each SV can transmit a signal which can include a carrier signal (e.g., a sinusoidal signal) that is modulated by GNSS data bits, a pseudo-random noise (PRN) code (e.g., unique to a given SV) and potentially also by an overlay code (e.g., the Neuman-Hoffman code). The PRN code can repeat itself through the signal (e.g., progressing through a complete cycle during a time period corresponding to one GNSS data bit). For example, a PRN code can have a rate of 2.046 megachips per second and repeat itself every one millisecond, and each GNSS data bits can have a duration of an integer number of milliseconds. The overlay code can have a rate slower than the rate of the PRN code (e.g., 1 kHz).

The receiver can also generate one or more codes (e.g., one or more PRN codes) and can have access to an overlay code. Thus, the receiver can attempt to identify a distance between itself and a SV based on a time delay between a locally generated PRN code and a PRN code in a received signal. This can first require estimating which SV transmitted the signal, which can be accomplished by cross correlating each of a set of locally generated PRN codes with the signal and identifying an SV associated with relatively strong cross-correlation. However, a moderately strong cross-correlation could be due to one of two factors: (1) an accurate match between a locally generated PRN code and a PRN code in a weak signal; or (2) an inaccurate match between a locally generated PRN code and a PRN code in a strong signal. Optimal location detection depends on distinguishing these situations.

Figure 2:
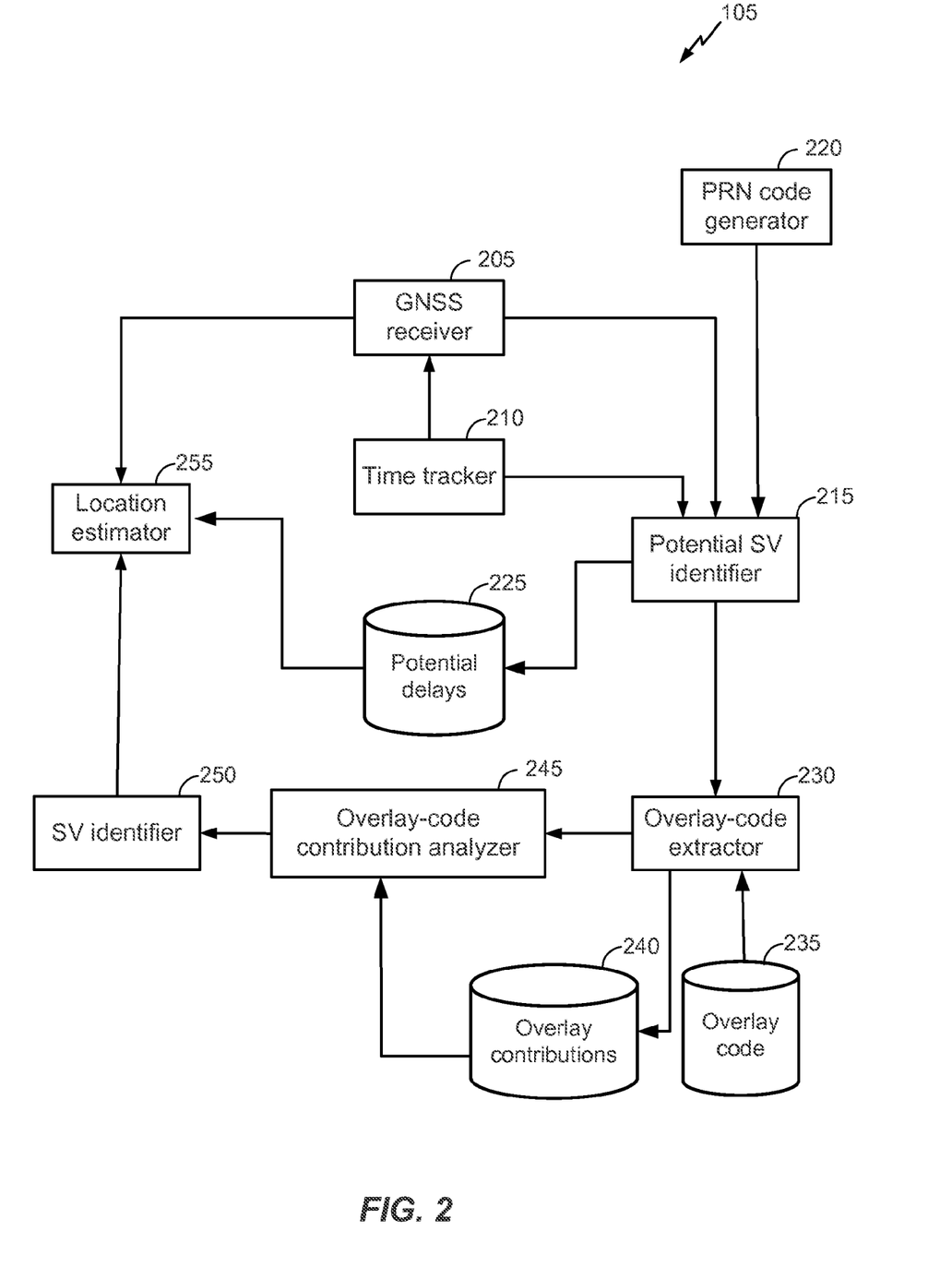
FIG. 2 is a block diagram showing exemplary components in mobile device 105 to achieve location-estimation capabilities according to an embodiment of the invention.

FIG. 2 is a block diagram showing exemplary components in mobile device 105 to achieve location-estimation capabilities according to an embodiment of the invention. Mobile device 105 can include a GNSS receiver 205 configured to receive signals from GNSS satellite 110. A time tracker 210 can associate a time with a received signal. The time can include, e.g., an absolute time or a local time. Time tracker 210 can include a clock, such as a crystal oscillator referenced clock.

The received signal can be transmitted to a potential SV identifier 215, which can access a set of PRN codes. Each PRN code can be generated by a local PRN code generator 220 and can be associated with a SV. Potential SV identifier 215 can cross-correlate the received signal with each generated PRN code and obtain a comparison metric (e.g., a maximum value in the cross-correlogram). One or more potential SVs can be identified based on the metric. For example, potential SV identifier 215 can identify as potential SVs all SVs associated with a comparison metric above a threshold.

For each potential SV, a potential time delay can also be determined based on a time difference between a PRN code in a received signal and a PRN code associated with the potential SV that was generated locally by PRN code generator 220. In one instance, the time delay is estimated based on an x-position of a peak in a cross-correlogram. The potential time delay can be stored in a potential-delay database 225, which can further associate the delay with a respective potential SV.

If only a single potential SV is identified, the potential identification can be confirmed by an SV identifier 250. Otherwise, the received signal can be passed to overlay-code extractor 230, which can extract an overlay-code contribution from the signal. For example, overlay-code extractor 230 can access an overlay code stored in an overlay-code database 235. The overlay code can be fixed (i.e., the same regardless of an SV at issue) or variable. Overlay-code extractor can extract the overlay code by, e.g., first cross-correlating the signal with the overlay code, subsequently identifying a time delay between the signal and the overlay code based on the cross-correlogram (e.g., identifying an x-position of a peak in the cross-correlogram), and next by defining the overlay-code contribution as the overlay code with a temporal offset associated with the delay. This extraction can be performed for each of a set of received signals.

Each extracted overlay-code contribution can be stored in an overlay-contribution database 240 along with identifiers of the potentially identified SV(s). An extracted overlay-code contribution can also be transmitted to an overlay-code contribution analyzer 245. If only one SV is potentially identified, overlay-code contribution analyzer 245 need not perform any analysis and an SV identifier 250 can confirm the SV identification.

If more than one SV are potentially identified, overlay-code contribution analyzer 245 can access both the overlay-code contribution associated with the signal at issue and can further access (e.g., through retrieval from overlay-contribution database 240) the overlay-code contribution of another signal. The other contribution can include a contribution associated with one of the potentially identified SV. For example, if a signal at issue ("signal #1") is potentially identified as having originated at SV #1 or SV #2, the other contribution ("signal #2") can be associated with a signal that had been previously identified as having originated with SV #2.

Overlay-code contribution analyzer 245 can then analyze the multiple contributions. As one example, the contributions are first combined. The combining can include taking a difference between the two contributions or generating a binary signal that is equal to a first value when values in the two contributions are the same or to a second value when values in the two signals are different. A fluctuating signal can suggest that the two contributions arose from signals from different SVs. Meanwhile, a relatively flat signal can suggest that the two contributions may have arisen from a signal from a single SV. The single SV can be the SV that has been identified as giving rise to a signal with one of the overlay contributions and was also potentially identified as potentially giving rise to a signal with another of the overlay contributions (e.g., SV #2 in the previous example).

Thus, upon a determination by overlay-code contribution analyzer 245 that the combined signal is fluctuating (or that the overlay-code contributions are shifted relative to each other by at least a threshold amount), SV identifier 250 can infer that the two contributions arose from signals from different SVs. Upon a determination by overlay-code contribution analyzer 245 that the combined signal is flat or upon a similar determination (e.g., as illustrated below), SV identifier 250 can infer that the two contributions arose from a signal from a single SV. Alternatively, in this latter instance, SV identifier 250 can first perform additional analyses. The additional analyses can include, e.g., applying a mask; determining whether power of a signal's spectrum (e.g., a spectrum of signal #1) at a Doppler frequency exceeds that expected due only to another signal (e.g., signal #2); or calculating—for each signal—a variable, and comparing a difference between the variables to one or more threshold (e.g., as further described in relation to FIGS. 7A-7B).

One technique (e.g., that can be performed by overlay-code contribution analyzer 245) for quantifying whether the combined signal is flat is to transform the combined signal into the frequency domain. If, e.g., absolute or relative power at 0 Hz or in a band around 0 Hz is below a threshold, SV identifier 250 can infer that the two contributions arose from signals from different SVs.

As another example of an analysis that can be performed on the contributions, overlay-code contribution analyzer 245 can cross-correlate the two contributions and identify a peak in the cross-correlogram. If the peak is not at 0 Hz or not in a defined frequency band around 0 Hz, SV identifier 250 can infer that the two contributions arose from signals from different SVs. Otherwise, SV identifier 250 can reach the opposite inference or perform additional analyses.

If SV identifier 250 determines that the two contributions arose from signals from different SVs, SV identifier 250 can inform a location estimator 255 to use both signals (each being associated with an extracted overlay-code contribution) in an estimation of a location. Meanwhile, if SV identifier 250 determines that the two contributions arose from a signal from single SV, SV identifier 250 can inform location estimator 255 not to use one of the signals (e.g., the signal with lower power). In either instance, SV identifier 250 can also inform location estimator 255 of a SV inferred to give rise to a signal.

Thus, a set of signals to use is identified (e.g., over a time period) to location estimator 255. For each signal, location estimator 255 can also access potential-delay database 225 and identify a delay associated with the signal and the identified SV. Based on the time delay, for each signal, location estimator 255 can estimate a distance between the SV and receiver 205. Location estimator 255 can further analyze the signal or other data to determine a location of an SV. Using the locations of each SV associated with the signal set and the estimated distances, location estimator 255 can estimate a location of GNSS receiver 205 (e.g., as geographical coordinates).

Figure 3:
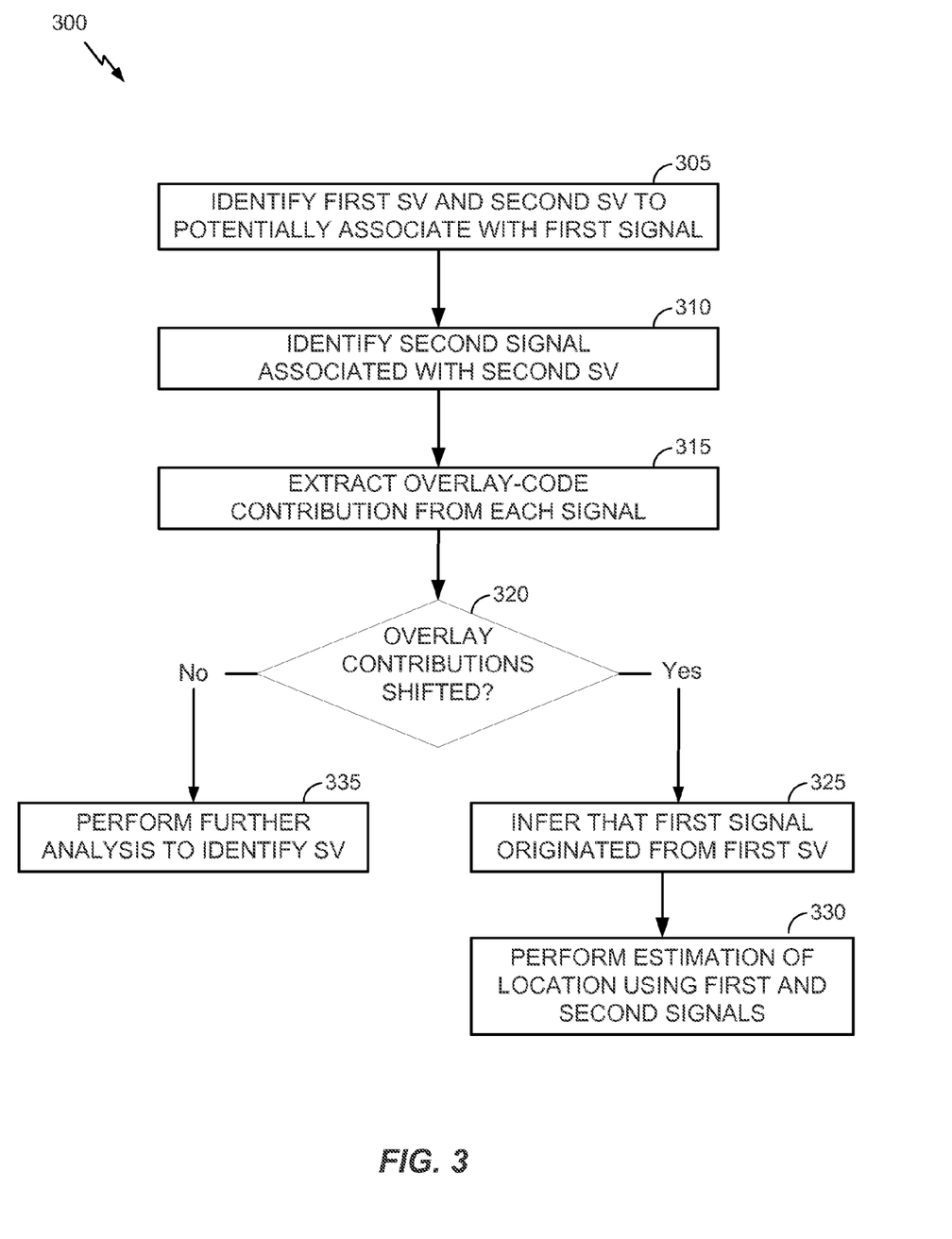
FIG. 3 is a flow diagram of a process for identifying an SV that gave rise to a received signal according to an embodiment of the invention.

FIG. 3 is a flow diagram of a process 300 for identifying an SV that gave rise to a received signal according to an embodiment of the invention. Part or all of process 300 can be performed by mobile device 105.

At block 305, a first SV and a second SV are identified as SVs that potentially may have transmitted the first signal. The SVs can be identified, e.g., by accessing a set of PRN codes (each being associated with an SV) and cross-correlating each PRN code with the signal. A cross-correlation metric (e.g., based on or equal to a peak amplitude) can be determined for each code. For each metric exceeding a threshold, an associated SV can be identified as potentially having transmitted the first signal. If only a single SV is identified, I can be inferred that that SV transmitted the signal and the signal can be used in a process to estimate a location (e.g., of a receiver that received the signal). Meanwhile, if multiple SVs are identified as potentially having transmitted the first signal, process 300 can continue to block 310. Though proves 300 refers to determining which of two SVs gave rise to a signal, it will be appreciated that the process can be extended to assess more potential SVs (e.g., by repeating blocks 310-335 for each non-first signal.

At block 310, a second signal associated with second first SV is identified. The second signal may have been associated with the second SV by a similar cross-correlation technique. The second signal may be a stronger signal or may have a stronger correlation with a PRN code as compared to the first signal.

At block 315, for each of the first and second signals, an overlay-code contribution to the signal is extracted. In some instances, temporal modulations and values of the overlay code are known and constant across SVs. Thus, the extraction may involve determining a temporal offset of the overlay code within the signal. Of course, values of a given signal will themselves not likely track the overlay code, due to the presence of other signal contributions (e.g., a PRN code). One technique for extracting the contribution is to cross-correlate a known overlay code with the signal, identify a temporal offset of the overlay code in the signal based on the cross-correlogram, and generate the contribution such that it is equal to the known overlay code with the identified temporal offset.

At block 320, it is determined whether an overlay-code contribution of the first signal is shifted with respect to an overlay-contribution of the second signal. For example, the query may involve comparing a shift between the contributions to a threshold (e.g., 1 ms). Specific examples about how the contributions can be analyzed to make this determination are described in further detail herein (see, e.g., FIGS. 4 and 6).

If it is determined that the contributions are shifted relative to each other, process 300 continues to block 325, at which it is inferred that the first signal originated from the first SV (e.g., and/or that the first signal did not originate from the second SV). That is, it can be inferred that the first signal is not merely a byproduct of the second signal. Thus, at block 330, both the first and second signals can be used to estimate a location (e.g., of a GNSS receiver, a mobile device 105 housing the GNSS receiver or a user using a mobile device 105 housing the GNSS receiver).

If it is determined that the contributions are not shifted relative to each other, process 300 continues to block 335, at which additional analysis is performed to identify which SV should be associated with the first signal. For example, a mask technique could be applied. A Doppler frequency and power at the Doppler frequency can be determined for the first signal. A maximum power that would be expected at the Doppler frequency can then be estimated in an instance in which the first signal is a byproduct of the second signal. If the identified power exceeds the maximum power, it can be determined that the first and second signals are to be associated with different SVs and are to both be used for location estimation. If the identified power does not exceed the maximum power, it can be determined that the first and second signals are to be associated with a same SV and only the stronger signal of the two is to be used for location estimation.

It will be appreciated that process 300 can thus avoid performance of additional analyses in some circumstances by extracting and analyzing the overlay-code contribution. This can decrease instances in which a weak but independent signal is cautiously not used for location estimation. Such instances can be rather common when multiple strong SV signals are present.

In some instances, rather than performing additional analysis at block 335, it is automatically inferred that the first signal originated from the second SV. Location estimation can then be performed using only one of the first and second signals (e.g., a stronger signal of the two or the second signal).

It will be appreciated that disclosed temporal-domain analyses can instead be performed in the frequency domain and the converse. For example, embodiments referring to cross-correlations (e.g., cross-correlating PRN codes with a signal) can instead utilize coherence techniques.

Figure 4:
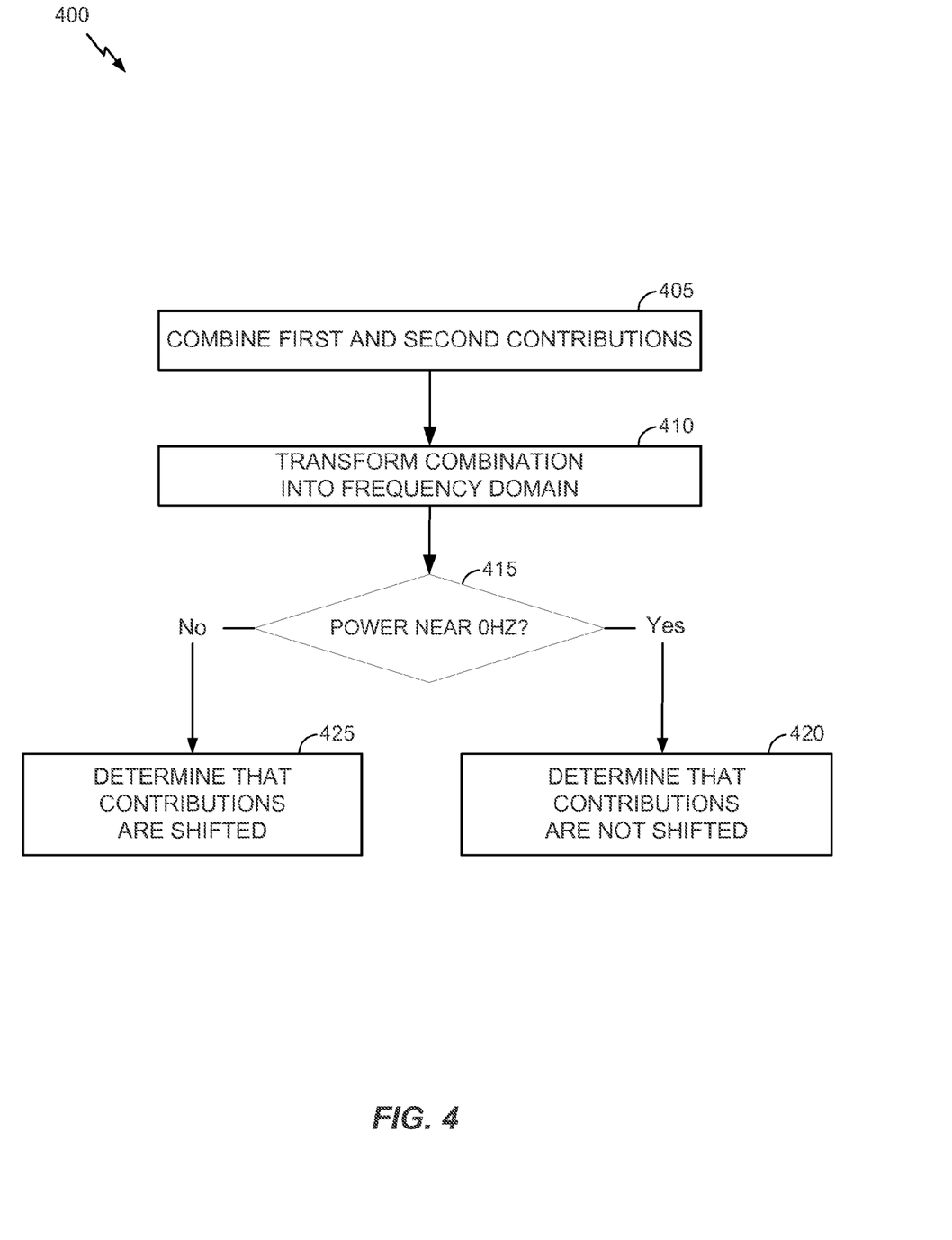
FIG. 4 is a flow diagram of a process for determining whether two overlay contributions are shifted relative to each other according to an embodiment of the invention.
Figure 5A:
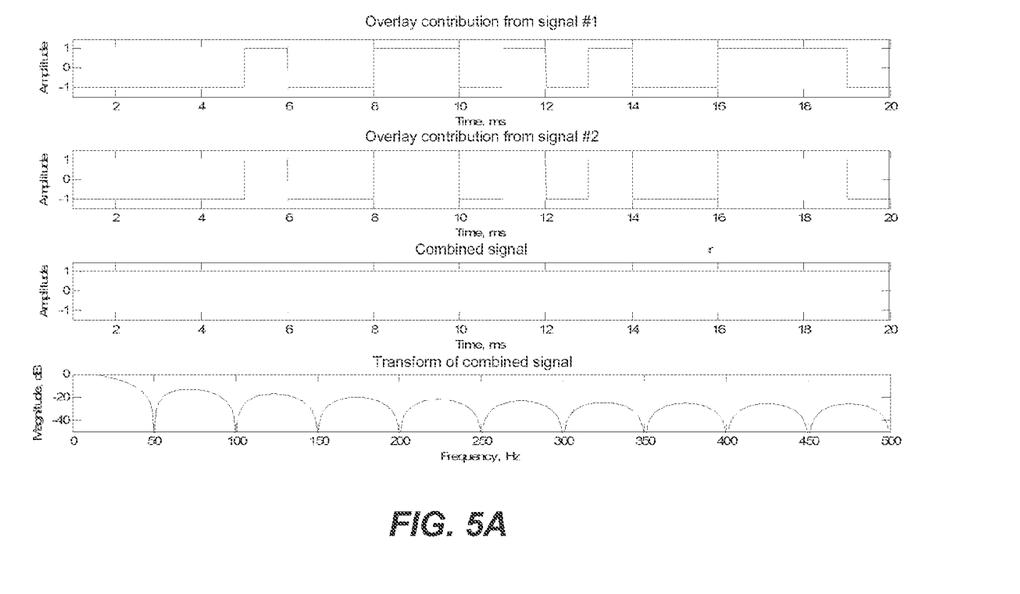
FIGS. 5A and 5B show simulation examples illustrating analysis of unshifted or shifted overlay contributions.
Figure 5B:
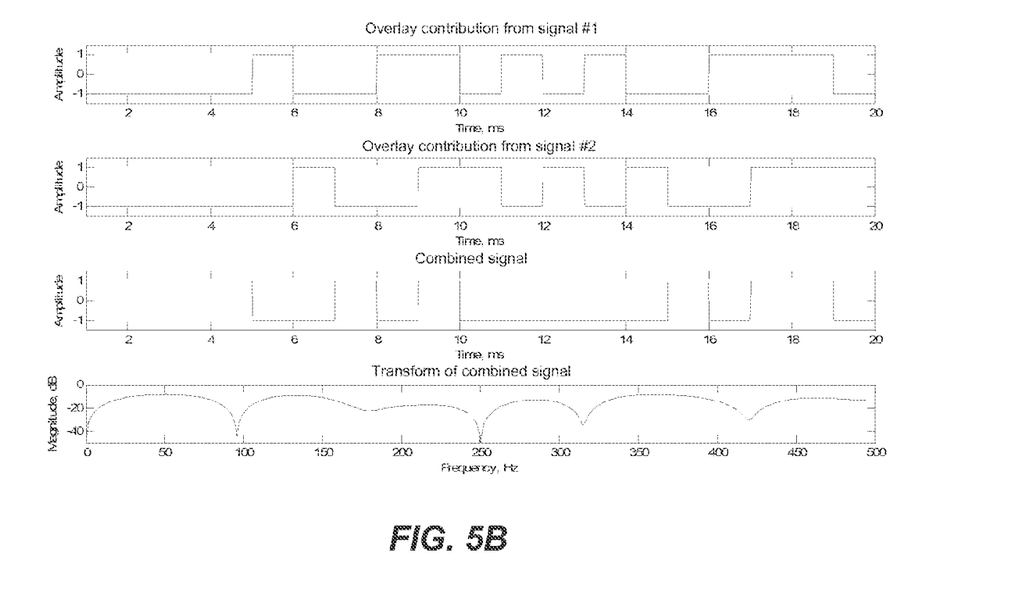

FIG. 4 is a flow diagram of a process 400 for determining whether two overlay contributions are shifted relative to each other according to an embodiment of the invention. For example, process 400 can be performed as part of decision block 320. FIGS. 5A and 5B show simulation examples illustrating part of process 400.

At block 405, the first and second overlay contributions are combined. As one example, a combination signal can be generated, in which the signal is equal to a first value when values of the first and second contributions are the same and is otherwise equal to a second value.

The top two plots in each of FIGS. 5A and 5B show examples of extracted overlay-code contributions. As can be visually seen, the contributions are perfectly aligned in FIG. 5A and are misaligned in FIG. 5B. The third plot in each of FIGS. 5A and 5B show a combined signal based on the respective contributions. Due to the alignment of the contributions in FIG. 5A, the combined signal is flat. Meanwhile, the combined signal in FIG. 5B is not flat.

At block 410, the combination signal is transformed into the frequency domain. The bottom plot in each of FIGS. 5A and 5B show transforms of the respective combined signal. In FIG. 5A, most of the energy concentrates around 0 Hz.

At block 415, it is determined whether power in the transformed signal is concentrated near 0 Hs. For example, a power or magnitude at 0 Hz can be compared to a threshold, a relative power or magnitude at 0 Hz (e.g., normalized by a total power or magnitude) can be compared to a threshold, a power or magnitude at a frequency band near 0 Hz can be compared to a threshold, or a cumulative relative power or magnitude at a frequency band near 0 Hz (e.g., normalized by a total power or magnitude) can be compared to a threshold. In FIG. 5A, the peak of the transformed combined signal occurs at 0 Hz, but a similar peak is not present in FIG. 5B.

If it is determined that power is concentrated near 0 Hz, it can then be determined (at block 420) that the contributions are not shifted relative to each other. If it is determined that power is not concentrated near 0 Hz, it can then be determined (at block 425) that the contributions are shifted relative to each other.

Figure 6:
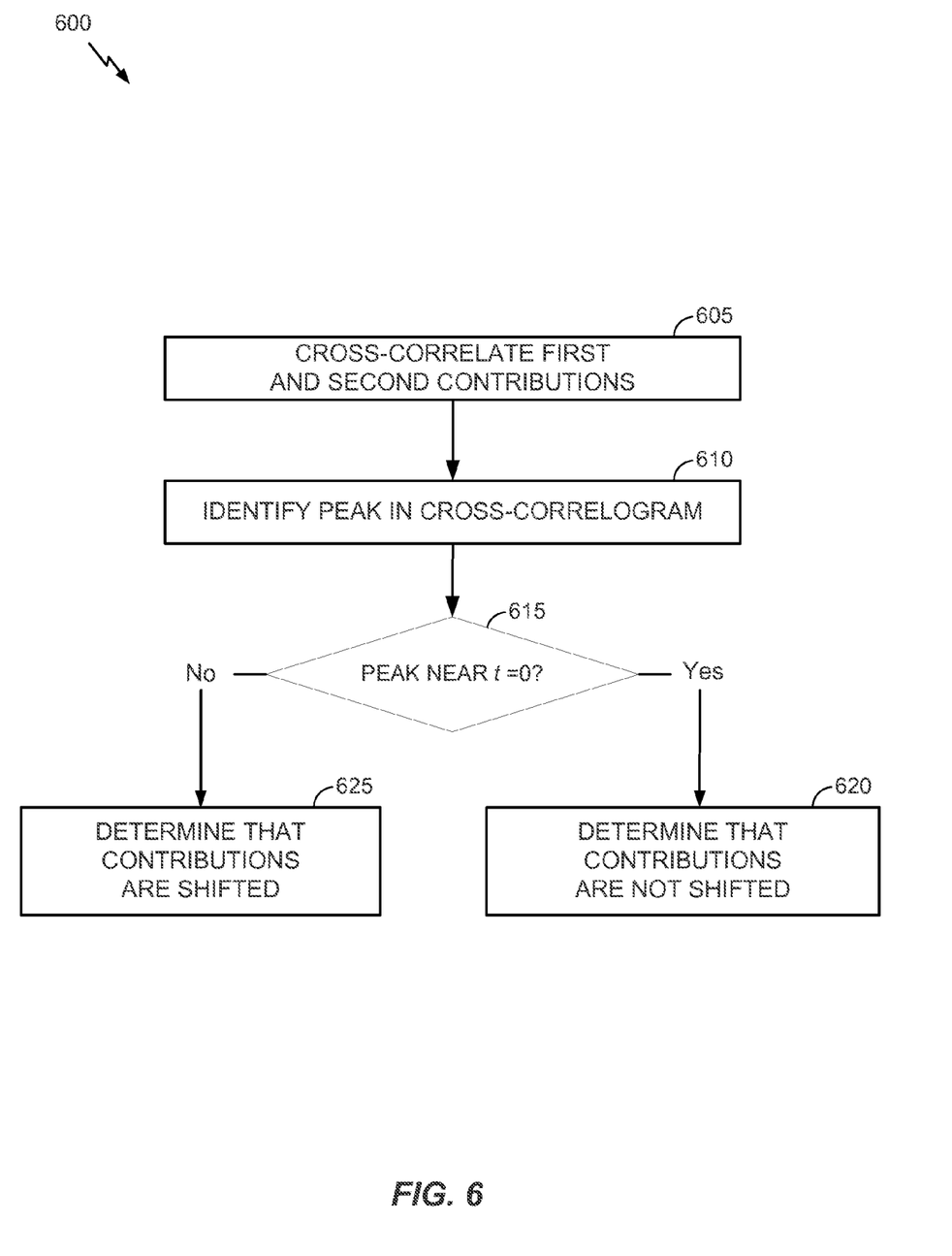
FIG. 6 is a flow diagram of a process for determining whether two overlay contributions are shifted relative to each other according to an embodiment of the invention.

FIG. 6 is a flow diagram of a process 600 for determining whether two overlay contributions are shifted relative to each other according to an embodiment of the invention. For example, process 600 can be performed as part of decision block 320.

At block 605, the first and second overlay-code contributions are cross-correlated to produce a cross-correlogram. At block 610, a peak in the cross-correlogram (e.g., an x-position of the peak) is identified. At block 615, it is determined whether the peak is near t=0. For example, it can be determined whether the peak is less than or greater than a threshold amount (e.g., 1 ms) from t=0.

If it is determined that the peak is near t=0, it can then be determined (at block 620) that the contributions are not shifted relative to each other. If it is determined that the peak is not near t=0, it can then be determined (at block 625) that the contributions are shifted relative to each other.

As noted with regard to FIG. 3, if it is determined at block 320 that the overlay contributions are not shifted, then further analysis can be performed at block 335 to determine whether an inference should be made that the first signal originated from the first SV or not. This can involve applying one or more masks, such that it is inferred that the first signal originated from the first SV only when one or more criteria are satisfied. A criterion can involve calculating a variable based on both the first and second signals and determining whether the variable is above or below one or more thresholds. For example, for each signal, a code phase can be calculated for each of the first and second signals (e.g., relative to a same locally generated code), and a code-phase-difference variable can be defined as the difference between the code phases. As another example, for each signal, a carrier-to-noise power density at each signal's Doppler frequency (CN0) can be calculated, and a CN0-difference variable can be defined as the difference between the CN0 values. As yet another example, for each signal, a Doppler frequency can be calculated, and a Doppler-difference variable can be defined as the difference between the Doppler frequency values. One or more of these variables can be compared to a threshold or to a defined range to determine whether it should be inferred that the signals originated from different SVs. Simulations or empirical data can be used to define the threshold(s) and/or range(s).

Figure 7A:
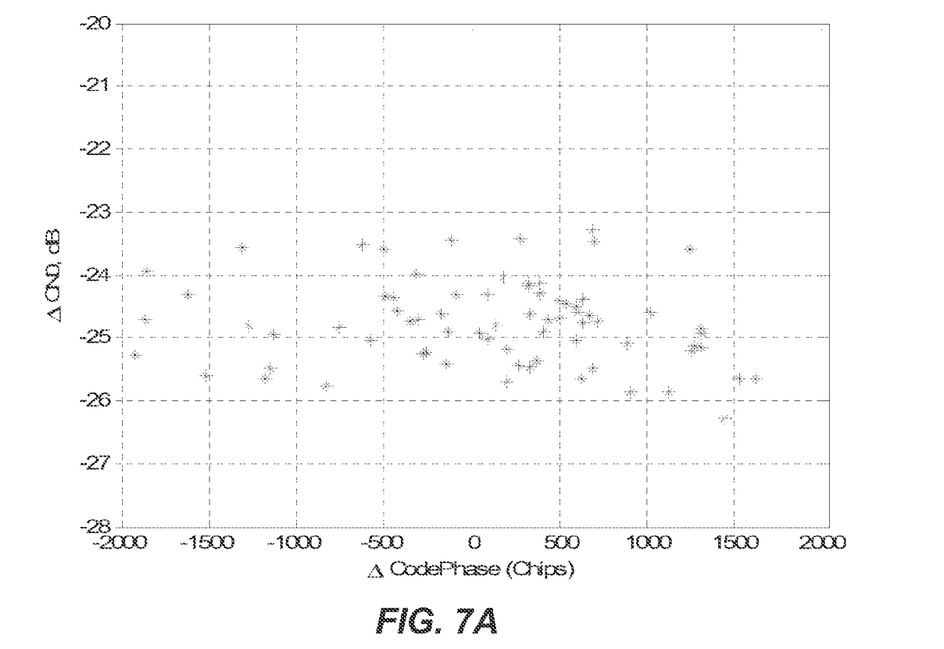
FIGS. 7A-7B show examples of simulation results resulting in variable values that may be observed when both the first and second signals originated from a single SV.
Figure 7B:
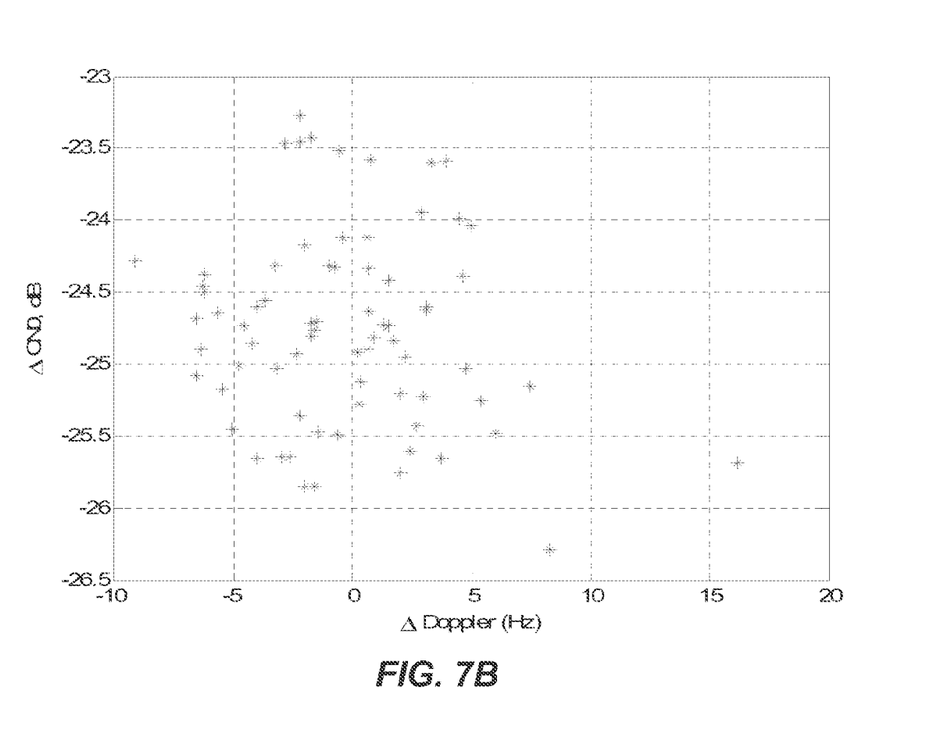

FIGS. 7A-7B show examples of simulation results resulting in variable values that may be observed when both the first and second signals originated from a single SV. Thus, thresholds and/or ranges set forth in criteria used to infer an independence of a second signal can be defined based on these types of results.

In this specific example, a set of sample source signals were generated, each using a randomly selected PRN code, a Doppler frequency randomly selected from within a range of −5 kHz to 5 kHz, a code phase was randomly selected from within a range of −20460 chips and 20460 chips, and a CN0 was defined as 45 dB-Hz. For each source signal, a set of ghost signal were also generated—each ghost signal using one of the PRN codes (but not the one used for the source signal). The Doppler frequency and code phrase were randomly selected from within the above-presented ranges. Thus, for each source signal, there exists a set of pairs between the source signal and the ghost signals. For each pair, CN0 values were calculated for the source and ghost signal using the PRN code used to generate the source signal, and the code-phase-difference, CN0-difference and Doppler-difference variables were defined as above.

FIG. 7A shows (for a sample of the simulation results) the CN0-difference values versus the code-phase-difference values. FIG. 7B shows (for a sample of the simulation results) the CN0-difference values versus the code-Doppler-difference values. Threshold values can be set such that all simulated data points or some portion (e.g., 95%) of the simulated data points fall above or below (depending on whether the threshold is a maximum or minimum threshold) the threshold value.

It will be appreciated that one or more criteria can be defined. For example, it may be inferred that first and second signals originated from different SVs unless each of code-phase-difference, CN0-difference and Doppler-difference variables fell within a defined respective range (or were above/below a respective threshold), or only a single difference variable may be compared to a defined respective range or threshold. Advantageously, these thresholding techniques need only be used in some instances—specifically, those in which it has been determined that overlay contributions are insufficiently shifted relative to each other. When a sufficient shift is detected, both signals can be used for location estimation regardless of any actual or potential analysis of variables such as the CN0-difference and Doppler-difference variables. Thus, weak signals can be accurately detected and used a greater portion of the time.

Figure 8:
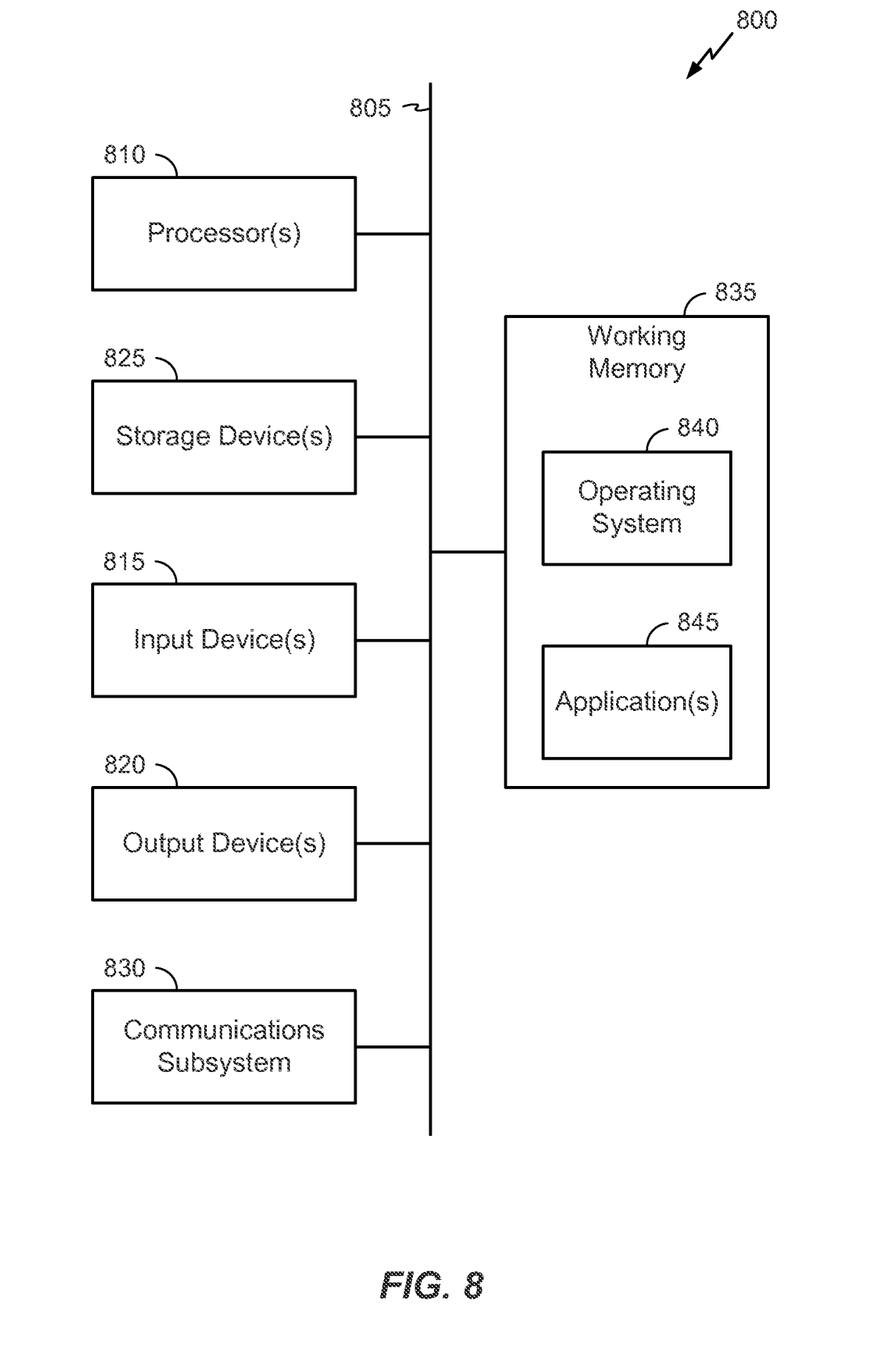
FIG. 8 illustrates an embodiment of a computer system.

A computer system as illustrated in FIG. 8 may be incorporated as part of the previously described computerized devices. For example, computer system 800 can represent some of the components of mobile device 105. FIG. 8 provides a schematic illustration of one embodiment of a computer system 800 that can perform all or part of methods described herein the methods described herein. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

Computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

Computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

Computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, computer system 800 will further comprise a working memory 835, which can include a RAM or ROM device, as described above.

Computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by computer system 800 and/or might take the form of source and/or installable code, which, upon compilation and/or installation on computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as computer system 800) to perform methods in accordance with various embodiments of the invention. According to a set of embodiments, some or all of the procedures of such methods are performed by computer system 800 in response to processor 810 executing one or more sequences of one or more instructions (which might be incorporated into operating system 840 and/or other code, such as an application program 845) contained in working memory 835. Such instructions may be read into working memory 835 from another computer-readable medium, such as one or more of storage device(s) 825. Merely by way of example, execution of the sequences of instructions contained in working memory 835 might cause processor(s) 810 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using computer system 800, various computer-readable media might be involved in providing instructions/code to processor(s) 810 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as storage device(s) 825. Volatile media include, without limitation, dynamic memory, such as working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for evaluating Global Navigation Satellite System (GNSS) signals, the method comprising:
   accessing a first GNSS signal received by a GNSS receiver;
   accessing a second GNSS signal received by the GNSS receiver, the second GNSS signal having temporal fluctuations weaker than temporal fluctuations in the first GNSS signal;
   estimating a delay between a sequence in the first GNSS signal and a corresponding sequence signal in the second GNSS signal;
   comparing the delay to a threshold; and
   upon determining that the delay exceeds the threshold, estimating a location using both the first GNSS signal and the second GNSS signal.

2. The method of claim 1, wherein determining that the delay exceeds the threshold comprises determining whether an absolute magnitude of the delay exceeds the threshold.

3. The method of claim 1, wherein estimating the delay comprises:
   cross-correlating the first GNSS signal with the second GNSS signal to produce a cross-correlogram; and
   identifying a horizontal offset of a peak in the cross-correlogram.

4. The method of claim 1, further comprising, upon determining that the delay does not exceed the threshold:
   calculating a difference variable comparing corresponding aspects of the first GNSS signal and the second GNSS signal;
   comparing the difference variable to a difference-variable threshold; and
   upon determining that the difference variable exceeds the difference-variable threshold, estimating the location using both the first GNSS signal and the second GNSS signal.

5. The method of claim 4, wherein the difference variable quantifies a difference between a carrier-to-noise power density at a Doppler frequency of the first GNSS signal and a carrier-to-noise power density at a Doppler frequency of the second GNSS signal.

6. The method of claim 4, wherein the difference variable quantifies a difference between a Doppler frequency of the first GNSS signal and a Doppler frequency of the second GNSS signal.

7. The method of claim 1, further comprising, upon determining that the delay does not exceed the threshold:
   applying a mask to a power spectrum associated with the second GNSS signal;
   determining whether a peak in the power spectrum remains after applying the mask; and
   upon determining that the peak in the power spectrum remains despite the mask application, estimating the location using both the first GNSS signal and the second GNSS signal.

8. A system for evaluating GNSS signals, the system comprising:
   a GNSS receiver configured to receive a first GNSS signal and to receive a second GNSS signal, the second GNSS signal having temporal fluctuations weaker than temporal fluctuations in the first GNSS signal;
   a code-contribution analyzer configured to:
      estimate a delay between a sequence in the first GNSS signal and a corresponding sequence signal in the second GNSS signal; and
      compare the delay to a threshold; and a location estimator configured to, upon a determination from the code-contribution analyzer that the delay exceeds the threshold, estimate a location using both the first GNSS signal and the second GNSS signal.

9. The system of claim 8, further comprising an overlay-code extractor configured to extract an overlay code from each of the second GNSS signal and the first GNSS signal, wherein the code-contribution analyzer is configured to estimate the delay between the overlay codes.

10. The system of claim 8, further comprising a satellite-vehicle identifier configured to, upon a determination from the code-contribution analyzer that the delay does not exceed the threshold:
apply a mask to the second GNSS signal, and
determine whether the second GNSS signal falls is masked by the mask,
wherein the location estimator is further configured to, upon a determination by the satellite-vehicle identifier that the second GNSS signal is not masked by the mask, estimate the location using both the first GNSS signal and the second GNSS signal.

11. The system of claim 8, wherein the first GNSS signal originated from a Beidou or Galileio E1 satellite vehicle.

12. A system for evaluating GNSS signals, the system comprising:
means for receiving a first GNSS signal and for receiving a second GNSS signal, the second GNSS signal having temporal fluctuations weaker than temporal fluctuations in the first GNSS signal;
means for estimating a delay between a sequence in the first GNSS signal and a corresponding sequence signal in the second GNSS signal;
means for comparing the delay to a threshold; and
means for estimating, upon determining that the delay exceeds the threshold, the location using both the first GNSS signal and the second GNSS signal.

13. The system of claim 12, further comprising:
means for calculating, upon determining that the delay does not exceed the threshold, a difference variable comparing corresponding aspects of the first GNSS signal and the second GNSS signal;
means for comparing the difference variable to a difference-variable threshold; and
means for estimating, upon determining that the difference variable exceeds the difference-variable threshold, the location using both the first GNSS signal and the second GNSS signal.

14. The system of claim 13, wherein the difference variable comprises a difference between a Doppler frequency of the first GNSS signal and a Doppler frequency of the second GNSS signal.

15. The system of claim 12, further comprising means for extracting an overlay code from each of the second GNSS signal and the first GNSS signal, wherein the delay is one between the overlay codes.

16. A non-transitory computer-readable storage medium containing program instructions, that, when executed by a processor, cause the processor to execute a method comprising:
accessing a first GNSS signal received by a GNSS receiver;
accessing a second GNSS signal received by the GNSS receiver, the second GNSS signal having temporal fluctuations weaker than temporal fluctuations in the first GNSS signal;
estimating a delay between a sequence in the first GNSS signal and a corresponding sequence signal in the second GNSS signal;
comparing the delay to a threshold; and
upon determining that the delay exceeds the threshold, estimating a location using both the first GNSS signal and the second GNSS signal.

17. The non-transitory computer-readable storage medium of claim 16, wherein determining that the delay exceeds the threshold comprises determining whether an absolute magnitude of the delay exceeds the threshold.

18. The non-transitory computer-readable storage medium of claim 16, wherein estimating the delay comprises:
cross-correlating the first GNSS signal with the second GNSS signal to produce a cross-correlogram; and
identifying a horizontal offset of a peak in the cross-correlogram.

19. The non-transitory computer-readable storage medium of claim 16, wherein the method further comprises, upon determining that the delay does not exceed the threshold:
calculating a difference variable comparing corresponding aspects of the first GNSS signal and the second GNSS signal;
comparing the difference variable to a difference-variable threshold; and
upon determining that the difference variable exceeds the difference-variable threshold, estimating the location using both the first GNSS signal and the second GNSS signal.

20. The non-transitory computer-readable storage medium of claim 19, wherein the difference variable comprises a difference between a carrier-to-noise power density at a Doppler frequency of the first GNSS signal and a carrier-to-noise power density at a Doppler frequency of the second GNSS signal.

21. The non-transitory computer-readable storage medium of claim 16, wherein the method further comprises, upon determining that the delay does not exceed the threshold:
applying a mask to a power spectrum associated with the second GNSS signal;
determining whether a peak in the power spectrum remains after applying the mask; and
upon determining that the peak in the power spectrum remains despite the mask application, inferring that the first GNSS signal and the second GNSS signal arose from transmissions from different satellite vehicles.

* * * * *